Patented Nov. 25, 1947

2,431,451

UNITED STATES PATENT OFFICE 2,431,451

NITROOLEFINE DERIVATIVES OF MALONIC ESTERS AND PROCESS FOR PREPARING SAME

Carl T. Bahner, Jefferson City, Tenn.

No Drawing. Application March 2, 1945,
Serial No. 580,702

10 Claims. (Cl. 260—471)

This invention relates to compounds derivable from malonic esters, and more particularly to such ester derivatives wherein one of the active hydrogen atoms of the malonic ester has been substituted by a radical containing an aliphatic nitro group, and to a method for preparing nitro esters having the following structural formula:

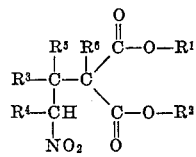

wherein $R^1$ and $R^2$ represent lower alkyl radicals, $R^3$, $R^4$, and $R^5$ may be hydrogen or lower alkyl, radicals, and $R^6$ may be hydrogen, aryl or lower alkyl radicals.

Among the compounds included in the above formula there may be mentioned 2-nitro-1-ethylbutylmalonic ethyl ester; 2-nitrobutylmalonic ethyl ester; 2-nitro-1-propylethylmalonic ethyl ester; 2-nitroethylmalonic ethyl ester; 2-nitro-1-methylethylmalonic butyl ester; 2-nitropropylmalonic propyl ester; 2-nitro-1-ethylbutylmalonic methyl ester; 2-nitro-1-propylethylmalonic pentyl ester; (2-nitrobutyl)ethyl malonic ethyl ester; nitrotertiarybutylmalonic ethyl ester; 2-(nitrobutyl)phenylmalonic ethyl ester, and the like.

An object of the present invention is to prepare derivatives of malonic acid esters wherein one of the active hydrogen atoms of the malonic ester is replaced by a radical containing an aliphatic nitro group.

A still further object of the invention is to provide a novel process for the preparation of such compounds.

Another object is to provide a process for the preparation of substituted malonic esters by the controlled reaction between a nitroolefine and a malonic ester.

Another object is to provide a process for the preparation of substituted malonic esters by reaction between a nitroolefine and an alkali metal salt of a malonic ester.

Many esterified and substituted derivatives of malonic acid have been prepared in the past, and many useful therapeutic compounds having a hypnotic or other effect have been formulated from the starting points of malonic acid, particularly the barbituric acids and their substitution products barbital, luminal, amytal, and the like. These prior art malonic ester derivatives are in most cases either derivatives in which the methyl- enic hydrogens have been alkylated or phenylated usually through the alkyl or aryl halide. In the case of the barbituric acid derivatives an ester of the appropriate alkyl or aryl acid is then reacted with urea to form the cyclic ureid.

I have now found, that if a malonic alkyl ester is allowed to react with aliphatic nitroolefines under favorable reaction conditions, substitution products will be produced in which the doubly bound carbon atom of the nitroolefine, adjacent to the carbon carrying the nitro group, is attached to the active methylenic carbon of the malonic ester, and which products present an entirely new series of products valuable as therapeutic agents and as intermediates for further synthesis of additional organic compounds.

The malonic esters which I use as starting materials, may be any alkyl malonic ester of the type illustrated by the formula below, and it may have one but not both of its active hydrogens substituted by an aryl or lower alkyl group as illustrated by the formula below

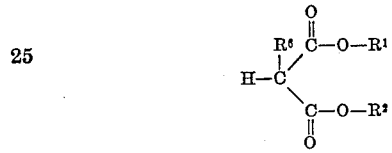

wherein $R^1$ and $R^2$ represent lower alkyl radicals, and $R^6$ may be hydrogen, aryl or a lower alkyl radical.

The nitroolefins adapted for use in my invention have the following general formula

wherein $R^3$, $R^4$ and $R^5$ represent hydrogen or lower alkyl radicals.

In practicing my invention, I may carry out the reaction under substantially anhydrous conditions in an inert solvent such as 1,4-dioxane, anhydrous alcohols or the like, or in a menstruum composed of an excess of one of the reactants, for example, the malonic ester, or I may carry out the reaction with no added liquid reaction medium. When carrying out the reaction in the presence of a solvent, I preferably first dissolve a diester of malonic acid in the inert solvent such as 1,4-dioxane, and then to prepare the alkali metal derivative of the malonic ester in any desired known manner, for example, by adding to this solution an alkali metal, for example, sodium or potassium metal. The nitroolefine is then added to the solution in small portions with agitation. When the reaction is complete, the alkali salt may be recovered as such or enough acid such as acetic acid, may be added to neutralize the sodium derivative, and free the aliphatic nitro substituted malonic ester. Separation of the reaction product, usually an oil, is effected by any convenient means such as diluting with water, evaporation, or the like. This reaction product is the nitro substituted product of the type described and the yields are almost the theoretical quantity.

It is not essential to use a molecular equivalent of sodium for each mole of malonic ester. For example, I have found that for a satisfactory reaction with one mole of diethyl malonate, and 2-nitro-1-butene, even as little as 0.2 mole of sodium is sufficient. In fact, the reaction will progress slowly without using the alkali metal, but such procedure is uneconomical and I have found, for example, that ratios of 0.1–1 mole of sodium to one mole of the malonic ester are optimum amounts for use in most cases in producing a speedy reaction with excellent yields.

The following examples are illustrative of my invention:

Example I

*Preparation of (2-nitro-1-ethylbutyl) malonic ester*

The sodium derivative of diethyl malonate was obtained by reacting 16 parts of diethyl malonate with 2.3 parts of "birdshot" sodium in 30 parts of dioxane. To the cool mixture 12.9 parts of 3-nitro-3-hexene was added in small portions with shaking. Heat was evolved as a rapid reaction occurred. Then 6 parts of glacial acetic acid were added which caused the formation of a gel. A large volume of water was added which reduced the gel and caused an oily layer of the reaction product to separate. This was the diethyl ester of (2-nitro-1-ethylbutyl) malonic acid, which distills at 125–130° C. at 1–2 mm. pressure. $d_4^{25}=1.0794$; $n_D^{27}=1.446$. Molecular refraction 71.2 calc. 71.5 observed.

Example II

*Preparation of (2-nitrobutyl) malonic ester*

Sixteen parts of diethyl malonate was added to .46 parts of sodium in 25 parts of dioxane. After all the sodium had dissolved, the mixture was cooled and 10 parts of 2-nitro-1-butene was added slowly with agitation. The color of the mixture became orange, heat was evolved and the lacrymatory odor of the nitroolefine disappeared quickly. An 85% yield of (2-nitrobutyl) malonic ester was obtained on acidifying the mixture with glacial acetic acid, diluting with a large volume of water and washing the oily layer twice with water. $d_4^{25}=1.1069$; $n_D^{26}=1.440$. Molecular refraction — calc. 61.9; found 62.2.

Example III

*Preparation of 2-nitro-1-propylethyl malonic ester*

A mixture of 0.46 part of sodium, 25 parts anhydrous dioxane and 16.0 parts of purified diethyl malonate was heated until all the sodium had dissolved, indicating formation of the sodium salt of the diethyl malonate, which dissolves in the dioxane as formed. The mixture was then cooled to 20° C. and 11.5 parts of fresh 1-nitro-1-pentene was added slowly with stirring over a period of about ten minutes. The temperature tended to rise to about 30° C., but was kept at about 20° by the use of an ice bath. After a further ten minutes, all lacrymatory odor of the nitroolefine had disappeared. At the end of an hour, the solution was cooled to 14° C. and modified by the addition of 1.2–1.4 parts of acetic acid to liberate the 2-nitro-1-propylethyl malonic ester from its sodium salt. The mixture was diluted with about 500 parts of water, and the product, 2-nitro-1-propylethyl malonic ester, separated as an oily liquid. After washing five times with small portions of water, the volume of the oily liquid (24 parts) corresponded to 95% of the theoretical yield. The crude product, when dried over calcium chloride, was found to have a refractive index when measured by means of a Fisher refractometer such that $n_D^{25}=1.443$, and $d_4^{25}=1.094$. Its molecular refraction was found to be $Mr_D^{25}=66.6$ compared to 66.6 as calculated for pure 2-nitro-1-propylethyl malonic ester. On further purification by vacuum distillation of 19 parts of the first fraction, about 3 parts came over up to 127° C. at 2–3 mm. pressure. The principal fraction consisting of 13 parts distilled at about 127° C. at 2–3 mm. pressure under an oil bath temperature of 141° C. This fraction was substantially pure 2-nitro-1-propylethyl malonic ester, having refraction constants as follows: $n_D^{25}=1.442$; $d_4^{25}=1.093$; $n_D^{25}=66.6$.

Example IV

*Preparation of (2-nitrobutyl) (ethyl) malonic ethyl ester*

The sodio derivative of ethyl diethyl malonate was prepared in 1,4-dioxane solution as described above, and to 0.15 mole of this derivative was slowly added 0.15 mole of 2-nitro-1-butene while maintaining the mixture at about 15° C. After reaction was complete the mixture was acidified with glacial acetic acid, diluted with benzene and distilled. The purified (2-nitrobutyl) (ethyl) malonic ethyl ester thus prepared had the following properties:

$d_4^{25}=1.076$  $n_D^{25}=1.443$.

Molecular refraction, calculated=71.2, found 71.3.

| Composition | Calculated | Found |
| --- | --- | --- |
| Carbon | 53.96 | 54.18 |
| Hydrogen | 8.01 | 8.10 |

Example V

*Preparation of nitrotertiarybutyl malonic ethyl ester*

To 15 parts absolute ethyl alcohol was added 0.72 parts sodium, then 6.4 parts diethyl malonate. After formation of the sodium derivative of diethyl malonate there was added 3.1 parts 1-nitro-2-methylpropene, dropwise, with agitation, during a period of about one-half hour. Temperature was kept at 25–35° C. by cooling with water bath as necessary. Reaction was rapid, but the mixture was allowed to stand 20 minutes longer before making slightly acid by addition of 2 parts of glacial acetic acid. Two days later the mixture was diluted to 250 parts with water. About 6.6 parts of crude product separated in the form of an oil which was washed well with water, diluted with an equal volume of benzene, centrifuged and filtered. The benzene and some unreacted malonic ester were removed by heating to 100° at 20 mm. The residue was then distilled through a semi-micro Vigreaux flask. The yield of distilled product, nitrotertiarybutyl malonic ethyl ester, was 5.7 parts, 72% of the theoretical. This product was redistilled in order to obtain a still purer product for analysis and a 2.0 parts fraction which distilled at about 105° C., manometer reading 1 mm., was taken for examination. Its properties were: $n_D^{25}=1.444$—$d_4^{25}=1.1156$. Molecular refraction found: 62.2; calculated: 61.9. Analysis showed a carbon content of 50.53%. Hydrogen 7.54%.

EXAMPLE VI

*Preparation of (2-nitrobutyl) (phenyl) malonic ethyl ester*

To 63 parts of absolute ethyl alcohol was added 2.3 parts sodium, then 23.1 parts phenylmalonic ethyl ester. After formation of the sodium derivative of the phenylmalonic ethyl ester there was added 10.1 parts 2-nitro-1-butene, in small portions, with vigorous stirring. Temperature was kept at 15–25° C. by cooling in an ice bath as required. About 20 minutes were required for the addition of the nitroolefine, then the mixture was allowed to stand one hour before acidification with 7 parts glacial acetic acid. After standing 2 days the mixture was diluted with distilled water. The crude, oily product which separated was diluted with 60 parts benzene, washed well with water, then recovered by distilling off the benzene under vacuum. The residue, 29.8 parts, was distilled at about 1 mm. pressure. About 20 parts of relatively pure (2-nitrobutyl) (phenyl) malonic ethyl ester was obtained. For further purification the product was fractionally distilled twice through a Vigreaux column and a fraction, 4.4 parts, which distilled at about 152° C. at about 1 mm. pressure was examined. Its properties were: $n_D^{25}=1.492$, $d_4^{25}=1.134$. Molecular refraction calculated: 86.1; found: 86.3.

The reaction will proceed slowly without any catalyst, as brought out above, but it is appreciably hastened by the use of small quantities of alkaline materials particularly the alkali metals. However, organic amines particularly the tertiary aliphatic amines can also be used to accelerate the reaction. However, on account of the fact that amines tend to favor side reactions, reducing the yield of desired products, and on account of the fact that the alkali metal salts of the malonic esters gave more rapid reaction, the use of the latter is preferred.

While the above description points out the preferred embodiments of my invention it will be understood that departures may be made therefrom within the scope of the specification and claims.

What is claimed is:

1. In a process for the preparation of aliphatic nitro substituted malonic esters having the following structural formula:

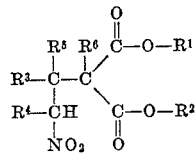

wherein $R^1$ and $R^2$ represent lower alkyl groups, $R^3$, $R^4$, and $R^5$ are members selected from the group consisting of hydrogen and lower alkyl radicals and $R^6$ is a member selected from the group consisting of hydrogen, aryl and lower alkyl radicals, the steps which comprise reacting an aliphatic nitroolefine having the following structural formula

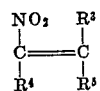

wherein $R^3$, $R^4$ and $R^5$, represent members selected from the group consisting of hydrogen and lower alkyl radicals with a malonic ester having the following structural formula

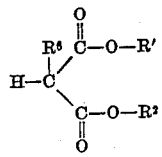

wherein $R'$ and $R^2$ represent lower alkyl groups, and $R^6$ is a member selected from the group consisting of hydrogen, aryl and lower alkyl radicals in the liquid phase in the presence of an alkaline material at temperature below about 35° C.

2. In a process for the preparation of aliphatic nitro substituted malonic esters having the following structural formula:

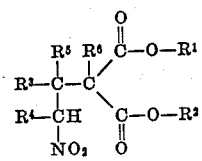

wherein $R^1$ and $R^2$ represent lower alkyl groups, $R^3$, $R^4$, and $R^5$ are members selected from the group consisting of hydrogen and lower alkyl radicals, $R^6$ is a member selected from the group consisting of hydrogen, aryl and lower alkyl radicals, the steps which comprise reacting an aliphatic nitroolefine having the following structural formula

wherein $R^3$, $R^4$ and $R^5$, represent members selected from the group consisting of hydrogen and lower alkyl radicals with an alkali metal derivative of a malonic ester having the following structural formula

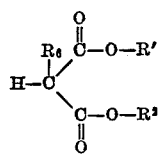

wherein $R'$ and $R^2$ represent lower alkyl groups, and $R^6$ is a member selected from the group consisting of hydrogen, aryl and lower alkyl radicals at temperature below about 35° C.

3. In a process for preparing 2-nitro-1-ethylbutyl malonic ester the step which comprises reacting an alkali metal derivative of malonic ethyl ester with 3-nitro-3-hexene at temperatures below about 35° C.

4. In a process for preparing (2-nitrobutyl) (ethyl) malonic ethyl ester, the step which comprises reacting an alkali metal derivative of ethyl malonic ethyl ester with 2-nitro-1-butene at temperatures below about 35° C.

5. In a process for preparing 2-nitro-1-propyl-ethyl-malonic ethyl ester, the step which comprises reacting an alkali metal derivative of malonic ethyl ester with 1-nitro-1-pentene at temperatures below about 35° C.

6. 2-nitro-1-ethylbutylmalonic ethyl ester.
7. (2-nitrobutyl) (ethyl) malonic ethyl ester.
8. 2-nitro-1-propylethylmalonic ethyl ester.
9. In the process for the preparation of aliphatic nitro substituted malonic esters having the following structural formula:

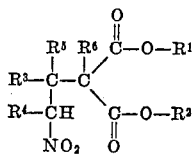

wherein $R^1$ and $R^2$ represent lower alkyl groups, $R^3$, $R^4$ and $R^5$ are members selected from the group consisting of hydrogen and lower alkyl radicals, and $R^6$ is a member selected from the group consisting of hydrogen, aryl and lower alkyl radicals, the steps which comprise reacting, at temperatures below about 35° C., an aliphatic nitroolefine having the following structural formula

wherein $R^3$, $R^4$ and $R^5$, represent members selected from the group consisting of hydrogen and lower alkyl radicals, with an alkali metal derivative of a malonic ester, having the following structural formula

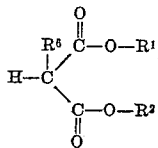

wherein $R^1$ and $R^2$ represent lower alkyl groups, and $R^6$ is a member selected from the group consisting of hydrogen, aryl and lower alkyl radicals in the liquid phase in the presence of an alkaline material and thereafter acidifying to liberate the free nitroalkyl malonic ester from its alkali metal salt.

10. As new compositions of matter, the nitro substituted malonic esters having the following structural formula:

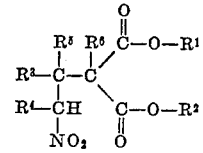

wherein $R^1$ and $R^2$ represent lower alkyl groups, and $R^3$, $R^4$, $R^5$ and $R^6$ are members selected from the group consisting of hydrogen and lower alkyl radicals.

CARL T. BAHNER.

REFERENCES CITED

The following references are of record in the file of this patent:

UNITED STATES PATENTS

| Number | Name | Date |
|---|---|---|
| 2,342,119 | Bruson | Feb. 22, 1944 |
| 2,396,626 | Wiest | Mar. 12, 1946 |

FOREIGN PATENTS

| Number | Country | Date |
|---|---|---|
| 400,452 | Great Britain | Oct. 26, 1933 |

OTHER REFERENCES

Kohler et al., "Jour. Am. Chem. Soc.," vol. 41 (1919), pp. 764–770.

Wiest, S. N. 374,864 (A. P. C.), June 15, 1943.

Certificate of Correction

Patent No. 2,431,451. November 25, 1947.

CARL T. BAHNER

It is hereby certified that errors appear in the printed specification of the above numbered patent requiring correction as follows: Column 1, line 16, after the word "alkyl" strike out the comma; column 4, line 4, Example III, for "modified" read *acidified*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*